US012096412B2

(12) United States Patent
Ren et al.

(10) Patent No.: US 12,096,412 B2
(45) Date of Patent: Sep. 17, 2024

(54) COMMUNICATION METHOD, APPARATUS AND DEVICE, AND COMPUTER-READABLE STORAGE MEDIUM

(71) Applicant: DATANG MOBILE COMMUNICATIONS EQUIPMENT CO., LTD., Beijing (CN)

(72) Inventors: Xiaotao Ren, Beijing (CN); Rui Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 380 days.

(21) Appl. No.: 17/613,837

(22) PCT Filed: May 18, 2020

(86) PCT No.: PCT/CN2020/090863
§ 371 (c)(1),
(2) Date: Nov. 23, 2021

(87) PCT Pub. No.: WO2020/238684
PCT Pub. Date: Dec. 3, 2020

(65) Prior Publication Data
US 2022/0248402 A1 Aug. 4, 2022

(30) Foreign Application Priority Data
May 24, 2019 (CN) .......................... 201910438545.3

(51) Int. Cl.
H04W 72/0453 (2023.01)
H04W 72/20 (2023.01)

(52) U.S. Cl.
CPC ....... *H04W 72/0453* (2013.01); *H04W 72/20* (2023.01)

(58) Field of Classification Search
CPC .................... H04W 72/0453; H04W 72/20
USPC ....................................................... 370/329
See application file for complete search history.

(56) References Cited

U.S. PATENT DOCUMENTS

| 11,122,543 | B2* | 9/2021 | Kim ...................... H04W 72/02 |
| 2016/0249307 | A1* | 8/2016 | Thangarasa ......... H04W 56/001 |
| 2017/0230956 | A1* | 8/2017 | Kim ....................... H04L 5/0032 |
| 2019/0104543 | A1* | 4/2019 | Park ..................... H04W 74/006 |

(Continued)

FOREIGN PATENT DOCUMENTS

| CN | 109417730 A | 3/2019 |
| CN | 109586881 A | 4/2019 |

(Continued)

OTHER PUBLICATIONS

U.S. Appl. No. 62/468,378 specification, All pages (Year: 2019).*

(Continued)

*Primary Examiner* — Anthony Mejia
(74) *Attorney, Agent, or Firm* — Ladas & Parry, LLP

(57) ABSTRACT

A communication method, a communication apparatus, a communication device and a computer-readable storage medium are provided. The method includes: performing Sidelink communication with a second device on a default first SL-BWP, or performing Sidelink communication with a second device on a second SL-BWP configured by a signaling, when at least two SL-BWPs are configured for the Sidelink communication with the second device.

14 Claims, 6 Drawing Sheets

(56) References Cited

U.S. PATENT DOCUMENTS

| | | | |
|---|---|---|---|
| 2019/0306911 A1* | 10/2019 | Hahn | H04W 72/20 |
| 2020/0236667 A1* | 7/2020 | Kwak | H04W 72/20 |
| 2021/0136730 A1* | 5/2021 | Kim | H04L 5/0051 |
| 2022/0022228 A1* | 1/2022 | Wang | H04W 4/46 |
| 2022/0039114 A1 | 2/2022 | Zhao | |
| 2022/0104238 A1* | 3/2022 | Aiba | H04L 5/0053 |

FOREIGN PATENT DOCUMENTS

| | | | | |
|---|---|---|---|---|
| CN | 111436089 B | * | 8/2021 | H04L 5/001 |
| CN | 111586710 B | * | 12/2021 | H04L 5/0048 |
| KR | 20210125062 | * | 2/2019 | H04W 72/20 |
| WO | WO-2017011079 A1 | * | 1/2017 | H04L 5/0053 |
| WO | 2017135998 A1 | | 8/2017 | |
| WO | WO-2018164476 A1 | * | 9/2018 | H04L 1/1867 |
| WO | WO-2020164009 A1 | * | 8/2020 | H04W 4/06 |

OTHER PUBLICATIONS

U.S. Appl. No. 62/795,596 specification, All pages (Year: 2017).*

First Office Action for the corresponding Korean Patent Application No. 10-2021-7041020 issued by the Korean Patent Office on Oct. 20, 2023 and its English translation provided by the foreign associate.

"Bandwidth Parts and Resource Pools for V2X sidelink," 3GPP TSG RAN WG1 Meeting #95 R1-1813555, Spokane, USA, Nov. 12-16, 2018, Spokane, USA, Nov. 12-16, 2018, Agenda Item: 7.2.4.1.5, Source: Huawei, HiSilicon.

"BWP operation for V2X sidelink," 3GPP TSG RAN WG1 Meeting #96bis R1-1904690, Xi'an, China, Apr. 8-12, 2019, Agenda Item: 7.2.4.8, Source: Huawei, HiSilicon.

"Spreadtrum Communications," 3GPP TSG RAN WG1 Meeting #96bis R1-1904792, Xi'an, China, Apr. 8-12, 2019, Agenda Item: 7.2.4.3, Source: Spreadtrum Communications.

First Chinese Office Action and search report for Chinese Patent Application 201910438545.3, issued on Apr. 29, 2021.

International Search Report (ISR) for PCT Application PCT/CN2020/090863 issued on Aug. 7, 2020 with translation provided by WIPO.

Written Opinion (WOSA) for PCT Application PCT/CN2020/090863 issued on Aug. 7, 2020 with translation provided by WIPO.

"Sidelink synchronization mechanisms for NR V2X" 3GPP TSG RAN WG1 Meeting #96bis, R1-1903946, Xi'an, China, Apr. 8-12, 2019, Agenda Item: 7.2.4.3, Source: Huawei, HiSilicon.

"Sidelink Synchronization Design for NR V2X Communication" 3GPP TSG RAN WG1 Meeting #96bis, R1-1904297, Xi'an, China, Apr. 8-12, 2019, Agenda Item: 7.2.4.3, Source: Intel Corporation.

"Sidelink physical layer structure and procedure for NR V2X" 3GPP TSG RAN WG1 Meeting #94, R1-1808093, Gothenburg, Sweden, Aug. 20-24, 2018, Agenda Item: 7.2.4.1.2, Source: Huawei, HiSilicon.

"Physical layer structure for NR-V2X" 3GPP TSG RAN WG1 #97, R1-1906472, Reno, USA, May 13-17, 2019 Source: OPPO, Agenda Item: 7.2.4.1.

Extended European Search Report for European Application No. 20814914.6 issued on May 20, 2022.

VIVO: "Sidelink synchronization mechanism", 3GPP Draft; R1-1907689 Sidelink Synchronization Mechanism, 3rd Generation Partnership Project (3GPP), Mobile Competence Centre; 650, Route Des Lucioles; F-06921 Sophia-Antipolis Cedex; France vol. RAN WGI, No. Reno, USA; May 13, 2019-May 17, 2019 (May 16, 2019), entire document.

Huawei et al: "Sidelink PHY structure and procedure for NR V2X", 3GPP Draft; R1-1810138, 3rd Generation Partnership Project (3GPP), Mobile Competence-Centre; 650, Route Des Lucioles; F-06921 Sophia-Antipolis Cedex; France vol. RAN WGI (Sep. 29, 2018), entire document.

First Office Action for Indian Application No. 202127056644 issued on Jun. 2, 2022.

* cited by examiner

COMMUNICATION METHOD, APPARATUS AND DEVICE, AND COMPUTER-READABLE STORAGE MEDIUM

CROSS-REFERENCE TO RELATED APPLICATION

This application is the U.S. national phase of PCT Application No. PCT/CN2020/090863 filed on May 18, 2020, which claims a priority to Chinese Patent Application No. 201910438545.3 filed on May 24, 2019, the disclosures of which are incorporated in their entireties by reference herein.

TECHNICAL FIELD

The present disclosure relates to the field of communications technology, in particular, relates to a communication device, a communication apparatus, a communication device, and a computer readable storage medium.

BACKGROUND

In a LTE (Long Term Evolution) V2X (Vehicle-to-Everything) technology in the related art, a device uses an entirety of a Sidelink bandwidth for communication when communicating through a Sidelink. That is, when the device is searching for free resources, the entirety of the bandwidth is a candidate resource.

For NR (New Radio) V2X, a concept of SL-BWP (Sidelink-Bandwidth Part) is introduced. SL-BWP is similar to a BWP (Bandwidth Part) in NR, and is part of the bandwidth of an available frequency band for Sidelink communication. The difference between the SL-BWP and the BWP in NR is that the BWP in NR can be dynamically switched, but the SL-BWP cannot be dynamically switched and can be semi-statically configured, and configuration for the SL-BWP remains unchanged in one session.

When multiple SL-BWPs are configured simultaneously in NR V2X communication, if device 1 performs communication by using SL-BWP1 and device 2 performs communication by using SL-BWP2, then device 1 and device 2 cannot perform Sidelink communication since the SL-BWPs used are different, resulting in that a transmission success rate of Sidelink communication packets is low.

SUMMARY

The embodiments of the present disclosure provide a communication method, a communication apparatus, a communication device and a computer-readable storage medium, so as to solve the problem of low transmission success rate of Sidelink communication packets.

In a first aspect, the embodiments of the present disclosure provides a communication method applied to a first device. The method includes: performing Sidelink communication with a second device on a default first Sidelink-Bandwidth Part (SL-BWP), or performing Sidelink communication with a second device on a second SL-BWP configured by a signaling, when at least two SL-BWPs are configured for Sidelink communication with a second device.

Under a condition that there is no signaling indicating the SL-BWP used for performing the Sidelink communication between the first device and the second device, the Sidelink communication with the second device is performed on the default first SL-BWP; under a condition that the second SL-BWP is indicated, through a signaling, to be used for performing the Sidelink communication between the first device and the second device, the Sidelink communication with the second device is performed on the second SL-BWP.

The at least two SL-BWPs are configured on at least two carriers, and one SL-BWP is configured for one carrier.

Configuration of the second SL-BWP is performed through a signaling in a Sidelink communication link, and a manner of the configuration includes any of the following: notifying configuration information of the second SL-BWP to the second device through a signaling carried in a Sidelink Synchronization Signal Block (S-SSB); receiving configuration information of the second SL-BWP notified by the second device through a signaling carried in a S-SSB; notifying configuration information of the second SL-BWP to the second device through a signaling carried in a Physical Sidelink Control Channel (PSCCH); receiving configuration information of the second SL-BWP notified by the second device through a signaling carried in a PSCCH; receiving configuration information of the second SL-BWP notified by a third device through a signaling carried in a S-SSB, wherein the configuration information of the second SL-BWP is determined by the third device, or the configuration information of the second SL-BWP is determined by the third device and the fourth device through negotiation.

Configuration of the second SL-BWP is performed through a signaling in an air-interface Uu communication link, and a manner of the configuration includes any of the following: receiving configuration information of the second SL-BWP notified by a first base station through a System Information Block (SIB) message, wherein the configuration information of the second SL-BWP is determined by the first base station, or is determined by the second device and sent to the first base station; determining configuration information of the second SL-BWP, and sending the configuration information of the second SL-BWP to a second base station, so that the second base station notifies the second device of the configuration information of the second SL-BWP through a SIB message; receiving configuration information of the second SL-BWP notified by a third base station through a SIB message, wherein the configuration information of the second SL-BWP is determined by negotiation between the third base station and a fourth base station, or determined by the second device and sent to the fourth base station and is sent to the third base station by the fourth base station; determining configuration information of the second SL-BWP, and sending the configuration information of the second SL-BWP to the third base station, so that the third base station sends the configuration information of the second SL-BWP to the fourth base station, and the fourth base station notifies the second device of the configuration information of the second SL-BWP through a SIB message.

The configuration information of the second SL-BWP includes at least one of the following: a Cyclic Prefix (CP) type, a SubCarrier Spacing (SCS), a size and a location of a BWP (Bandwidth Part) bandwidth of the second SL-BWP.

The first SL-BWP is configured through a pre-configured manner; the pre-configured manner includes pre-configuration implemented through pre-set when the device is produced in factory.

In a second aspect, the embodiments of the present disclosure provide a communication method performed by a second device. The method includes: performing Sidelink communication with a first device on a default first Sidelink-Bandwidth Part (SL-BWP), or performing Sidelink communication with a first device on a second SL-BWP configured by a signaling, when at least two SL-BWPs are configured for Sidelink communication with a first device.

Under a condition that there is no signaling indicating the SL-BWP used for performing the Sidelink communication between the first device and the second device, the Sidelink communication with the first device is performed on the default first SL-BWP; under a condition that the second SL-BWP is indicated, through a signaling, to be used for performing the Sidelink communication between the first device and the second device, the Sidelink communication with the first device is performed on the second SL-BWP.

The at least two SL-BWPs are configured on at least two carriers, and one SL-BWP is configured for one carrier.

Configuration of the second SL-BWP is performed through a signaling in a Sidelink communication link, and a manner of the configuration includes any of the following: notifying configuration information of the second SL-BWP to the first device through a signaling carried in a Sidelink Synchronization Signal Block (S-SSB); receiving configuration information of the second SL-BWP notified by the first device through a signaling carried in a S-SSB; notifying configuration information of the second SL-BWP to the first device through a signaling carried in a Physical Sidelink Control Channel (PSCCH); receiving configuration information of the second SL-BWP notified by the first device through a signaling carried in a PSCCH; receiving configuration information of the second SL-BWP notified by a third device through a signaling carried in a S-SSB; receiving configuration information of the second SL-BWP notified by a fourth device through a signaling carried in a S-SSB, wherein the configuration information of the second SL-BWP is determined by the third device and the fourth device through negotiation.

Configuration of the second SL-BWP is performed through a signaling in an air-interface Uu communication link, and a manner of the configuration includes any of the following: receiving configuration information of the second SL-BWP notified by a first base station through a System Information Block (SIB) message, wherein the configuration information of the second SL-BWP is determined by the first base station, or is determined by the first device and sent to the first base station; determining configuration information of the second SL-BWP, and sending the configuration information of the second SL-BWP to the first base station, so that the first base station notifies the first device of the configuration information of the second SL-BWP through a SIB message; receiving configuration information of the second SL-BWP notified by a fourth base station through a SIB message, wherein the configuration information of the second SL-BWP is determined by negotiation between a third base station and the fourth base station, or determined by the first device and sent to the third base station and is sent to the fourth base station by the third base station; determining configuration information of the second SL-BWP, and sending the configuration information of the second SL-BWP to the fourth base station, so that the fourth base station sends the configuration information of the second SL-BWP to the third base station, and the fourth base station notifies the first device of the configuration information of the second SL-BWP through a SIB message.

The configuration information of the second SL-BWP includes at least one of the following: a Cyclic Prefix (CP) type, a SubCarrier Spacing (SCS), a size and a location of a BWP (Bandwidth Part) bandwidth of the second SL-BWP.

The first SL-BWP is configured through a pre-configured manner; the pre-configured manner includes pre-configuration implemented through pre-set when the device is produced in factory.

In a third aspect, the embodiment of the present disclosure provide a communication apparatus applied to a first device. The communication apparatus includes a processing module configured for, performing Sidelink communication with a second device on a default first Sidelink-Bandwidth Part (SL-BWP), or performing Sidelink communication with a second device on a second SL-BWP configured by a signaling, when at least two SL-BWPs are configured for the Sidelink communication with the second device.

The processing module is specifically configured for: under a condition that there is no signaling indicating a SL-BWP used for performing the Sidelink communication between the first device and the second device, performing the Sidelink communication with the second device on using the default first SL-BWP; under a condition that the second SL-BWP is indicated, through a signaling, to be used for performing Sidelink communication between the first device and the second device, performing the Sidelink communication with the second device on the second SL-BWP.

In a fourth aspect, the embodiments of the present disclosure provide a communication apparatus. The communication apparatus is applied to a second device and includes a processing module configured for, performing Sidelink communication with a first device on a default first Sidelink-Bandwidth Part (SL-BWP), or performing Sidelink communication with a first device on using a second SL-BWP configured by a signaling, when at least two SL-BWPs are configured for the Sidelink communication with the first device.

The processing module is specifically configured for: under a condition that there is no signaling indicating the SL-BWP used for performing the Sidelink communication between the first device and the second device, performing the Sidelink communication with the first device on the default first SL-BWP; under a condition that the second SL-BWP is indicated, through a signaling, to be used for performing the Sidelink communication between the first device and the second device, performing the Sidelink communication with the first device on the second SL-BWP.

In a fifth aspect, the embodiments of the present disclosure provide a communication device applied to a first device. The communication device includes: a transceiver, a memory, a processor and a computer program stored on the memory and executable on the processor; wherein, the processor is configured to read the program in the memory and execute the following steps: performing Sidelink communication with a second device on a default first Sidelink-Bandwidth Part (SL-BWP), or performing Sidelink communication with a second device on using a second SL-BWP configured by a signaling, when at least two SL-BWPs are configured for the Sidelink communication with the second device.

The processor is further configured to read the program in the memory and perform the following steps: performing Sidelink communication with a second device on a default first SL-BWP, under a condition that there is no signaling indicating the SL-BWP used for performing the Sidelink communication between the first device and the second device; performing Sidelink communication with a second device on the second SL-BWP, under a condition that the second SL-BWP is indicated, through a signaling, to be used for performing the Sidelink communication between the first device and the second device.

The at least two SL-BWPs are configured on at least two carriers, and one SL-BWP is configured for one carrier.

Configuration of the second SL-BWP is performed through a signaling in a Sidelink communication link; the processor is further configured to read the program in the memory and perform any of the following: notifying configuration information of the second SL-BWP to the second device through a signaling carried in a Sidelink Synchronization Signal Block (S-SSB); receiving configuration information of the second SL-BWP notified by the second device through a signaling carried in a S-SSB; notifying configuration information of the second SL-BWP to the second device through a signaling carried in a Physical Sidelink Control Channel (PSCCH); receiving configuration information of the second SL-BWP notified by the second device through a signaling carried in a PSCCH; receiving configuration information of the second SL-BWP notified by a third device through a signaling carried in a S-SSB, wherein the configuration information of the second SL-BWP is determined by the third device, or the configuration information of the second SL-BWP is determined by the third device and the fourth device through negotiation.

Configuration of the second SL-BWP is performed through a signaling in an air-interface Uu communication link, the processor is further configured to read the program in the memory and perform any of the following: receiving configuration information of the second SL-BWP notified by a first base station through a System Information Block (SIB) message, wherein the configuration information of the second SL-BWP is determined by the first base station, or is determined by the second device and sent to the first base station; determining configuration information of the second SL-BWP, and sending the configuration information of the second SL-BWP to a second base station, so that the second base station notifies the second device of the configuration information of the second SL-BWP through a SIB message; receiving configuration information of the second SL-BWP notified by a third base station through a SIB message, wherein the configuration information of the second SL-BWP is determined by negotiation between the third base station and a fourth base station, or determined by the second device and sent to the fourth base station and is sent to the third base station by the fourth base station; determining configuration information of the second SL-BWP, and sending the configuration information of the second SL-BWP to the third base station, so that the third base station sends the configuration information of the second SL-BWP to the fourth base station, and the fourth base station notifies the second device of the configuration information of the second SL-BWP through a SIB message.

The configuration information of the second SL-BWP includes at least one of the following: a Cyclic Prefix (CP) type, a SubCarrier Spacing (SCS), a size and a location of a BWP (Bandwidth Part) bandwidth of the second SL-BWP.

The processor is further configured to read the program in the memory and perform the following: configuring the first SL-BWP in a pre-configured manner; the pre-configured manner includes pre-configuration implemented through pre-set when the device is produced in factory.

In a sixth aspect, the embodiments of the present disclosure provide a communication device applied to a second device. The communication device includes a transceiver, a memory, a processor and a computer program stored on the memory and executable on the processor; wherein, the processor is configured to read the program in the memory and execute the following steps: performing Sidelink communication with a first device on a default first Sidelink-Bandwidth Part (SL-BWP), or performing Sidelink communication with a first device on a second SL-BWP configured by a signaling, when at least two SL-BWPs are configured for the Sidelink communication with the first device.

The processor is further configured to read the program in the memory and perform the following steps: performing the Sidelink communication with the first device on the default first SL-BWP, under a condition that there is no signaling indicating the SL-BWP used for performing the Sidelink communication between the first device and the second device; performing the Sidelink communication with the first device on the second SL-BWP, under a condition that the second SL-BWP is indicated, through a signaling, to be used for performing the Sidelink communication between the first device and the second device.

The at least two SL-BWPs are configured on at least two carriers, and one SL-BWP is configured for one carrier.

Configuration of the second SL-BWP is performed through a signaling in a Sidelink communication link, the processor is further configured to read the program in the memory and perform any of the following: notifying configuration information of the second SL-BWP to the first device through a signaling carried in a Sidelink Synchronization Signal Block (S-SSB); receiving configuration information of the second SL-BWP notified by the first device through a signaling carried in a S-SSB; notifying configuration information of the second SL-BWP to the first device through a signaling carried in a Physical Sidelink Control Channel (PSCCH); receiving configuration information of the second SL-BWP notified by the first device through a signaling carried in a PSCCH; receiving configuration information of the second SL-BWP notified by a third device through a signaling carried in a S-SSB; receiving configuration information of the second SL-BWP notified by a fourth device through a signaling carried in a S-SSB, wherein the configuration information of the second SL-BWP is determined by the third device and the fourth device through negotiation.

Configuration of the second SL-BWP is performed through a signaling in an air-interface Uu communication link, the processor is further configured to read the program in the memory and perform any of the following: receiving configuration information of the second SL-BWP notified by a first base station through a System Information Block (SIB) message, wherein the configuration information of the second SL-BWP is determined by the first base station, or is determined by the first device and sent to the first base station; determining configuration information of the second SL-BWP, and sending the configuration information of the second SL-BWP to the first base station, so that the first base station notifies the first device of the configuration information of the second SL-BWP through a SIB message; receiving configuration information of the second SL-BWP notified by a fourth base station through a SIB message, wherein the configuration information of the second SL-BWP is determined by negotiation between a third base station and the fourth base station, or determined by the first device and sent to the third base station and is sent to the fourth base station by the third base station; determining configuration information of the second SL-BWP, and sending the configuration information of the second SL-BWP to the fourth base station, so that the fourth base station sends the configuration information of the second SL-BWP to the third base station, and the fourth base station notifies the first device of the configuration information of the second SL-BWP through a SIB message.

The configuration information of the second SL-BWP includes at least one of the following: a Cyclic Prefix (CP) type, a SubCarrier Spacing (SCS), a size and a location of a BWP (Bandwidth Part) bandwidth of the second SL-BWP.

The processor is further configured to read the program in the memory and perform the following: configuring the first SL-BWP in a pre-configured manner; the pre-configured manner includes pre-configuration implemented through pre-set when the device is produced in factory.

In a seventh aspect, the embodiments of the present disclosure provide a computer-readable storage medium for storing a computer program, wherein when the computer program is executed by a processor, the processor implements steps in the method according to the first aspect; or, when the computer program is executed by the processor, the processor implements steps in the method according to the second aspect In the embodiments of the present disclosure, when at least two SL-BWPs are configured, the two devices can use the determined SL-BWP for Sidelink communication, thereby improving the transmission success rate of Sidelink communication packets.

BRIEF DESCRIPTION OF THE DRAWINGS

In order to more clearly explain technical solutions of embodiments of the present disclosure, drawings needed to be used in description of the embodiments of the present disclosure will be briefly introduced. It is obvious that the drawings in the following description are only some embodiments of the present disclosure. Those skilled in the art may also obtain other drawings without paying creative labor.

DETAILED DESCRIPTION

The technical solutions in the embodiments of the present disclosure will be clearly and thoroughly described below in combination with the accompanying drawings in the embodiments of the present disclosure. Obviously, the described embodiments are part, rather than all, of the embodiments of the present disclosure. All other embodiments obtained by those skilled in the art based on the embodiments in the present disclosure without paying creative work belong to the protection scope of the present disclosure.

Figure 1:
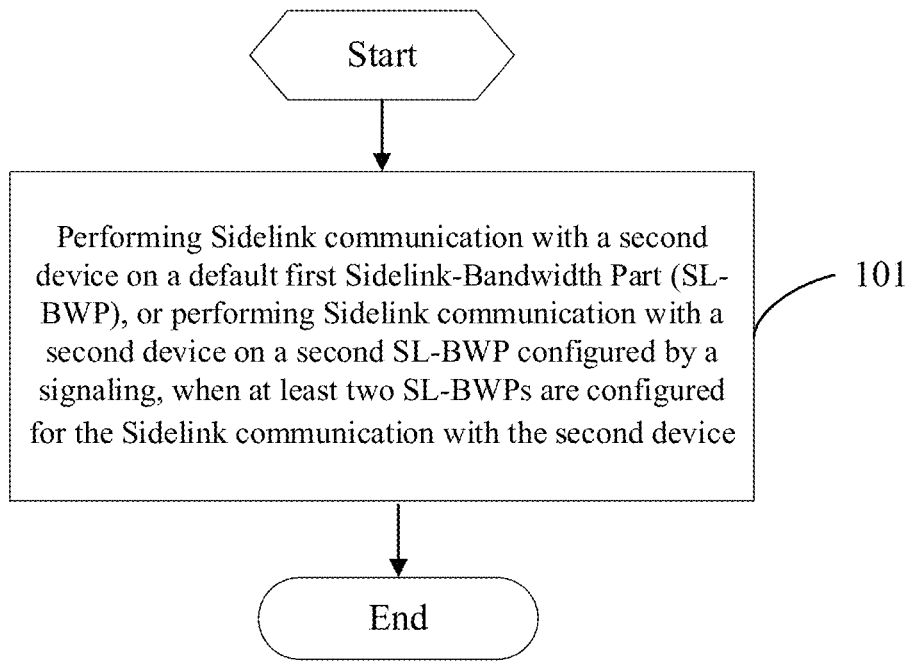
FIG. 1 is a first flowchart of a communication method provided by an embodiment of the present disclosure.

Referring to FIG. 1, FIG. 1 is a flowchart of a communication method provided by the embodiments of the present disclosure, this method is applied to the first device. As shown in FIG. 1, the method includes a following step 101.

Step 101: when at least two SL-BWPs are configured for Sidelink communication with a second device, performing Sidelink communication with the second device on a default first SL-BWP, or performing Sidelink communication with the second device on a second SL-BWP configured by a signaling.

Specifically, under a condition that there is no signaling indicating the SL-BWP used for performing the Sidelink communication between the first device and the second device, the Sidelink communication with the second device is performed on the default first SL-BWP; under a condition that the second SL-BWP is indicated, through a signaling, to be used for performing the Sidelink communication between the first device and the second device, the Sidelink communication with the second device is performed on the second SL-BWP.

In the embodiments of the present disclosure, at least two SL-BWPs are configured on at least two carriers, and one SL-BWP is configured for one carrier.

The first SL-BWP is configured in a pre-configuration manner which includes a manner of being pre-set when the device is produced in factory.

That is, the first SL-BWP completes configuration of a default SL-BWP through the pre-configuration manner. The pre-configuration manner includes pre-configuration implemented through pre-set when the device is produced in factory. In this case, the default SL-BWP is solidified for the device.

To improve flexibility of the configuration, the second SL-BWP can be configured in following manners.

1, Configuration of the second SL-BWP is performed through a signaling in a Sidelink communication link, and a manner of the configuration includes any of the following:

notifying configuration information of the second SL-BWP to the second device through a signaling carried in a S-SSB;

receiving the configuration information of the second SL-BWP notified by the second device through the signaling carried in the S-SSB;

notifying configuration information of the second SL-BWP to the second device through a signaling carried in PSCCH;

receiving configuration information of the second SL-BWP notified by the second device through the signaling carried in the PSCCH;

receiving configuration information of the second SL-BWP notified by a third device through the signaling carried in the S-SSB, wherein the configuration information of the second SL-BWP is determined by the third device, or the configuration information of the second SL-BWP is determined by the third device and the fourth device through negotiation.

2, Configuration of the second SL-BWP is performed through a signaling in an air-interface Uu communication link, and a manner of the configuration includes any of the following:

receiving configuration information of the second SL-BWP notified by a first base station through a SIB message, wherein the configuration information of the second SL-BWP is determined by the first base station, or is determined by the second device and sent to the first base station;

determining configuration information of the second SL-BWP, and sending the configuration information of the second SL-BWP to a second base station, so that the second base station notifies the second device of the configuration information of the second SL-BWP through SIB message;

receiving configuration information of the second SL-BWP notified by a third base station through a SIB message, wherein the configuration information of the second SL-BWP is determined by negotiation between the third base station and a fourth base station, or determined by the second device and sent to the fourth base station and is sent to the third base station by the fourth base station;

determining configuration information of the second SL-BWP, and sending the configuration information of the second SL-BWP to the third base station, so that the third base station sends the configuration information of the second SL-BWP to the fourth base station, and the fourth base station notifies the second device of the configuration information of the second SL-BWP through a SIB message.

The configuration information of the second SL-BWP includes at least one of the following: a CP (Cyclic prefix) type, a SCS (SubCarrier Spacing), a size and a location of a BWP (Bandwidth Part) bandwidth, and the like of the second SL-BWP.

In the embodiments of the present disclosure, when at least two SL-BWPs are configured, two devices can perform the Sidelink communication by using the determined SL-BWPs, thereby improving a success rate of transmission of Sidelink communication packets.

Figure 2:
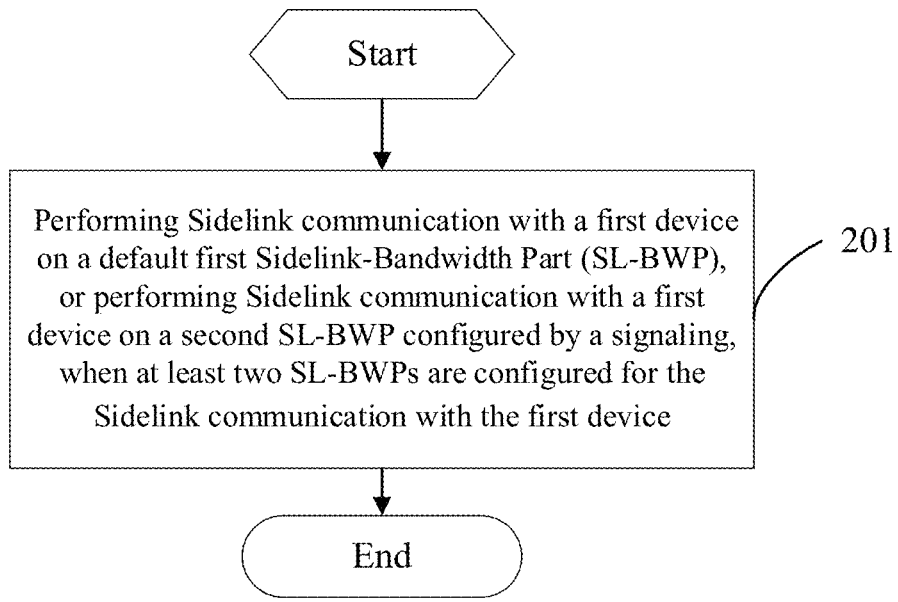
FIG. 2 is a second flowchart of a communication method provided by an embodiment of the present disclosure.

Referring to FIG. 2, FIG. 2 is a flowchart of a communication method provided by the embodiments of the present disclosure. The method is applied to a second device, as shown in FIG. 2, the method includes the following step 201.

Step 201: when at least two SL-BWPs are configured for Sidelink communication with a first device, performing the Sidelink communication with the first device on a default first SL-BWP, or performing the Sidelink communication with the first device on a second SL-BWP configured by a signaling.

Specifically, under a condition that there is no signaling indicating the SL-BWP used for performing the Sidelink communication between the first device and the second device, the Sidelink communication with the first device is performed on the default first SL-BWP; under a condition that the second SL-BWP is indicated, through a signaling, to be used for performing Sidelink communication between the first device and the second device, the Sidelink communication with the first device is performed on the second SL-BWP.

In the embodiments of the present disclosure, at least two SL-BWPs are configured on at least two carriers, and one SL-BWP is configured for one carrier.

The first SL-BWP is configured in a pre-configuration manner which includes a manner of being pre-set when the device is produced in factory.

That is, the first SL-BWP completes configuration of a default SL-BWP through the pre-configuration manner. The pre-configuration manner includes pre-configuration implemented through pre-set when the device is produced in factory. In this case, the default SL-BWP is solidified for the device.

To improve flexibility of the configuration, the second SL-BWP can be configured in following manners.

1, Configuration of the second SL-BWP is performed through a signaling in a Sidelink communication link, and a manner of the configuration includes any of the following:

notifying configuration information of the second SL-BWP to the first device through a signaling carried in a S-SSB;

receiving the configuration information of the second SL-BWP notified by the first device through the signaling carried in the S-SSB;

notifying configuration information of the second SL-BWP to the first device through a signaling carried in PSCCH;

receiving configuration information of the second SL-BWP notified by the first device through the signaling carried in the PSCCH;

receiving configuration information of the second SL-BWP notified by a third device through a signaling carried in a S-SSB;

receiving configuration information of the second SL-BWP notified by a fourth device through a signaling carried in the S-SSB, wherein the configuration information of the second SL-BWP is determined by the third device and the fourth device through negotiation.

2, Configuration of the second SL-BWP is performed through a signaling in an air-interface Uu communication link, and a manner of the configuration includes any of the following:

receiving configuration information of the second SL-BWP notified by a first base station through a SIB message, wherein the configuration information of the second SL-BWP is determined by the first base station, or is determined by the first device and sent to the first base station;

determining configuration information of the second SL-BWP, and sending the configuration information of the second SL-BWP to the first base station, so that the first base station notifies the first device of the configuration information of the second SL-BWP through a SIB message;

receiving configuration information of the second SL-BWP notified by a fourth base station through a SIB message, wherein the configuration information of the second SL-BWP is determined by negotiation between a third base station and the fourth base station, or determined by the first device and sent to the third base station and is sent to the fourth base station by the third base station;

determining configuration information of the second SL-BWP, and sending the configuration information of the second SL-BWP to the fourth base station, so that the fourth base station sends the configuration information of the second SL-BWP to the third base station, and the fourth base station notifies the first device of the configuration information of the second SL-BWP through a SIB message.

The configuration information of the second SL-BWP includes at least one of the following: a CP type, a SCS, a size and a location of a BWP bandwidth, and the like of the second SL-BWP.

In the embodiments of the present disclosure, when at least two SL-BWPs are configured, two devices can perform the Sidelink communication by using the determined SL-BWPs, thereby improving a success rate of transmission of Sidelink communication packets.

In the embodiments of the present disclosure, the first device performs Sidelink communication with the second device. When at least two SL-BWPs are configured in Sidelink communication, and if there is no signaling indicating which SL-BWP of the at least two SL-BWPs is used for performing the Sidelink communication, the Sidelink communication is performed on the first SL-BWP. If a second SL-BWP of the at least two SL-BWPs is indicated, through a signaling, to be used for performing the Sidelink communication between the first device and the second device, the Sidelink communication is performed on the second SL-BWP. The first BWP is a default SL-BWP. The embodiments of the present disclosure are mainly applied to Sidelink communication in a V2X system.

In the embodiments of the present disclosure, the devices include, but are not limited to, a terminal, a lamp post, an RSU (Road-Side Unit), a micro station, etc.

Figure 3:
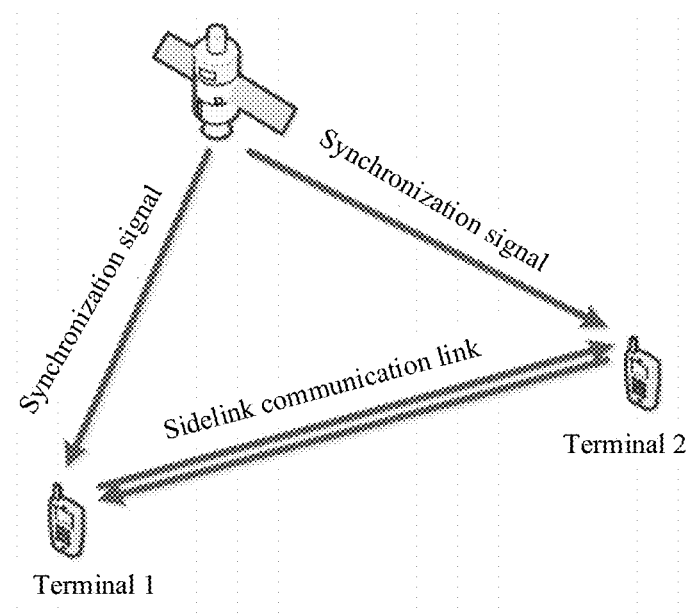
FIG. 3 is a first schematic diagram of an application scenario provided by an embodiment of the present disclosure.

As shown in FIG. 3, taking the first device being a terminal 1 and the second device being a terminal 2 as an example, the terminal 1 and the terminal 2 perform Sidelink communication, and both the terminal 1 and the terminal 2 are configured with at least two SL-BWPs for Sidelink communication. Without any signaling indication, the terminal 1 and the terminal 2 use the default SL-BWP for communication. If the terminal 1 and the terminal 2 negotiate a SL-BWP used for performing the Sidelink communication, they use the negotiated SL-BWP for performing the Sidelink communication.

Hereinafter, a process of implementation of the communication method of the embodiments of the present disclosure will be described in detail in combination with different application scenarios. In the following embodiments, Sidelink communication between two terminals is described as an example. The implementation principle in case that the first device and the second device are of other forms is the same as that of the terminals.

Figure 4:
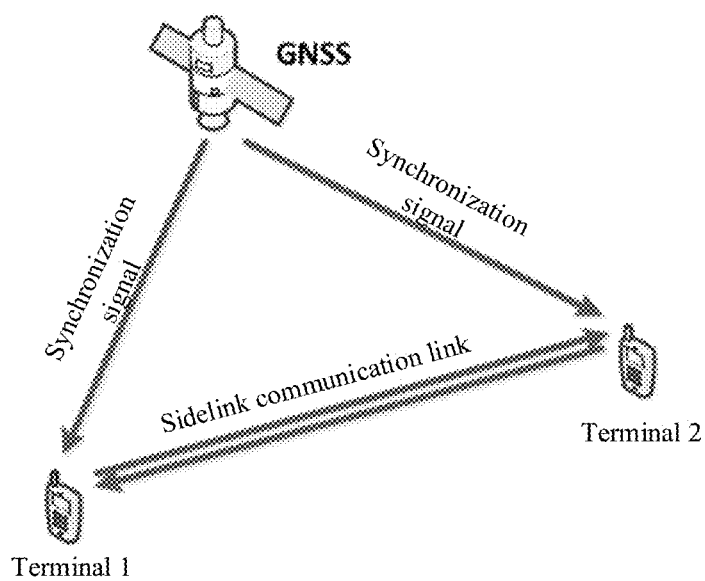
FIG. 4 is a second schematic diagram of an application scenario provided by an embodiment of the present disclosure.

As shown in FIG. 4, in one scenario, GNSS (Global Navigation Satellite System) is a highest-priority synchronization source.

For the terminal 1 and the terminal 2, if a GNSS synchronization source is currently configured as the highest-priority synchronization source, and both terminals are within a coverage of a GNSS signal, therefore, the terminal 1 and the terminal 2 are synchronized with the GNSS synchronization source. In this case, since both the terminal 1 and the terminal 2 are synchronized with the highest-priority synchronization source, they do not need to find other synchronization sources and do not need to receive a S-SSB.

When the terminal 1 and the terminal 2 are configured with at least two SL-BWPs, it is necessary to determine the SL-BWP used for performing the Sidelink communication between the terminal 1 and the terminal 2. In this scenario, a method of indicating the SL-BWP used by the terminal 1 and the terminal 2 for performing Sidelink communication includes:

a first manner: the terminal 1 and the terminal 2 perform Sidelink communication by using the default SL-BWP; for example, a Default SL-BWP is pre-configured, which can be the SL-BWP used by the S-SSB, and this default SL-BWP is used for communication until a new configuration message is received;

a second manner: during communication of the two terminals, the two terminals can determine, through interaction via a S-SSB or PSCCH channel, the SL-BWP used for subsequent communication; after the interaction is successful, the Sidelink communication can be performed by using the SL-BWP determined through the interaction.

The application scenario of this embodiment is that both the terminal 1 and the terminal 2 are configured with the GNSS synchronization source as the highest-priority synchronization source, and both terminals are synchronized with GNSS. By adopting the solution in the embodiments of the present disclosure, it can be ensured that the terminal 1 and the terminal 2 can negotiate the SL-BWP used for performing Sidelink communication between the two terminals.

Figure 5:
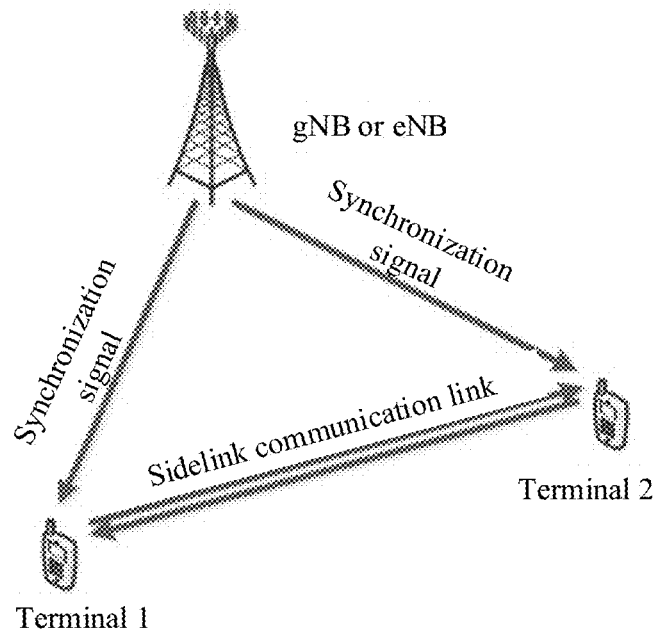
FIG. 5 is a third schematic diagram of an application scenario provided by an embodiment of the present disclosure.

As shown in FIG. 5, in one scenario, a gNB (NR Node B, a NR node) or an eNB (evolved Node b, an evolved base station) is a highest-priority synchronization source, both terminals are within a signal coverage of the same gNB cell or the same eNB cell, and both terminals are synchronized with the same gNB cell or the same eNB cell.

For the terminal 1 and the terminal 2, if a gNB synchronization source or an eNB synchronization source is currently configured as the highest-priority synchronization source, and both terminals are within the signal coverage of the same gNB cell or the same eNB cell, therefore, both the terminal 1 and the terminal 2 are synchronized with the same gNB cell synchronization source or the same eNB cell synchronization source. In this case, since both the terminal 1 and the terminal 2 are synchronized with the highest-priority synchronization source, they do not need to find other synchronization sources and do not need to receive a S-SSB.

When the terminal 1 and the terminal 2 are configured with at least two SL-BWPs, it is necessary to determine the SL-BWP used for Sidelink communication between the terminal 1 and the terminal 2. In this scenario, a method of indicating the SL-BWP used by the terminal 1 and the terminal 2 for performing Sidelink communication includes:

a first manner: the terminal 1 and the terminal 2 perform Sidelink communication by using the default SL-BWP; for example, a Default SL-BWP is pre-configured, which can be the SL-BWP used by the S-SSB, and this Default SL-BWP is used for communication until a new configuration message is received;

a second manner: during communication of the two terminals, the two terminals can determine, through interaction via a S-SSB or PSCCH channel, the SL-BWP used for subsequent communication; after the interaction is successful, the Sidelink communication is performed by using the SL-BWP determined through the interaction;

a third manner: the gNB or the eNB cell sends, to the terminal 1 and the terminal 2 through a Uu interface signaling (such as a SIB21 message), a configuration message of the SL-BWP used by the two terminals for Sidelink communication; the configuration message of the SL-BWP sent to the two terminals is the same, so as to ensure that the terminal 1 and the terminal 2 can perform Sidelink communication by using the same SL-BWP. In this case, there are many situations:

1) a first situation: the gNB cell or the eNB cell determines the SL-BWP used by the terminal 1 and the terminal 2 for performing Sidelink communication, and then notifies the terminal 1 and the terminal 2 respectively through the Uu interface signaling;

2) a second situation: the terminal 1 determines the SL-BWP used by the terminal 1 and the terminal 2 for performing Sidelink communication, and then the terminal 1 reports information of the SL-BWP to the gNB cell or the eNB cell, then the gNB cell or the eNB cell sends information of the determined SL-BWP to the terminal 2;

3) a third situation: the terminal 2 determines the SL-BWP used by the terminal 1 and the terminal 2 for performing Sidelink communication, and then the terminal 2 reports information of the SL-BWP to the gNB cell or the eNB cell, then the gNB cell or the eNB cell sends configuration information of the determined SL-BWP to the terminal 1.

The application scenario of this embodiment is that both the terminal 1 and the terminal 2 are configured with the gNB synchronization source or the eNB synchronization source as the highest-priority synchronization source, and both terminals are synchronized with the same gNB cell or the same eNB cell. By adopting the solution in the embodiments of the present disclosure, it can be ensured that the terminal 1 and the terminal 2 can negotiate the SL-BWP used for performing Sidelink communication between the two terminals.

Figure 6:
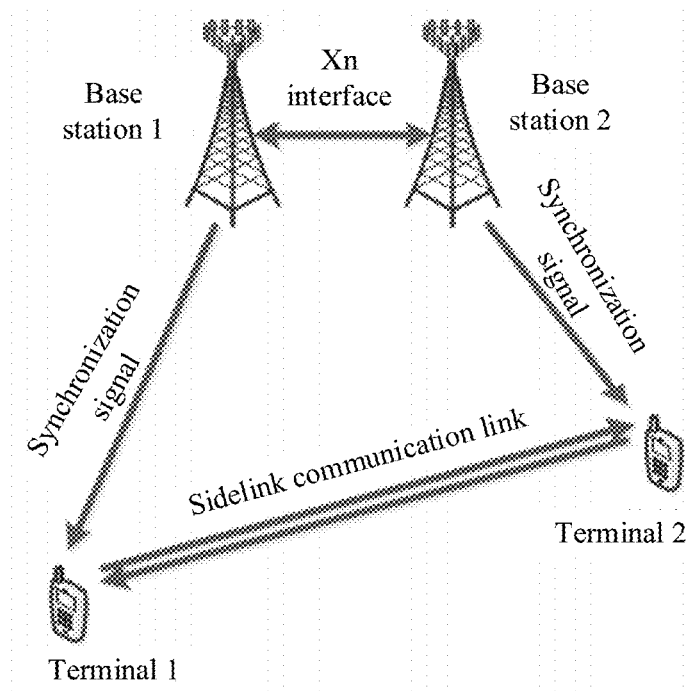
FIG. 6 is a fourth schematic diagram of an application scenario provided by an embodiment of the present disclosure.

As shown in FIG. 6, in one scenario, gNB or eNB or GNSS is the highest-priority synchronization source, the two terminals are within a signal coverage of two different gNB cells or two different eNB cells, and the two terminals are synchronized with two different gNB cells or two different eNB cells, respectively.

For the terminal 1 and the terminal 2, the gNB synchronization source or the eNB synchronization source is currently configured as the highest-priority synchronization source, and both terminals are within the signal coverage of two different gNB cells or two different eNB cells, respectively. As shown in FIG. 6, the terminal 1 is within a signal coverage of a base station 1 and the terminal 2 is within a signal coverage of a base station 2. In this case, the terminal 1 and the terminal 2 are synchronized with different gNB cell synchronization sources or different eNB cell synchronization sources, that is, the terminal 1 is synchronized with the base station 1 and the terminal 2 is synchronized with the base station 2. In this case, since both the terminal 1 and the terminal 2 are synchronized with the highest-priority synchronization source, they do not need to find other synchronization sources and do not need to receive a S-SSB.

When the terminal 1 and the terminal 2 are configured with at least two SL-BWPs, it is necessary to determine the SL-BWP used for performing Sidelink communication between the terminal 1 and the terminal 2. In this scenario, the method of indicating the SL-BWP used by the terminal 1 and the terminal 2 for performing Sidelink communication includes:

a first manner: the terminal 1 and the terminal 2 perform the Sidelink communication by using the default SL-BWP; for example, a Default SL-BWP is pre-configured, which can be the SL-BWP used by the S-SSB, and this default SL-BWP is used for communication until a new configuration message is received;

a second manner: during communication of the two terminals, the two terminals can determine, through interaction via a S-SSB or PSCCH channel, the SL-BWP used for subsequent communication; after the interaction is successful, the Sidelink communication can be performed by using the SL-BWP determined through the interaction;

a third manner: two gNBs or two eNBs determine the configuration information of the SL-BWP for Sidelink communication between the terminal 1 and the terminal 2 through interacting information through an Xn interface between the two gNBs or the two eNBs; then, the two gNB cells or the two eNB cells send, to the terminal 1 and the terminal 2 through respective Uu interface signalings, such as SIB21 messages, the configuration messages of the SL-BWP used by the two terminal for Sidelink communication. The configuration messages of the SL-BWP sent to the two terminals are the same, so as to ensure that the terminal 1 and the terminal 2 can perform Sidelink communication by using the same SL-BWP. In this case, there are many situations:

1) a first situation: the first or the second gNB cell or the first or the second eNB cell determines the SL-BWP used by the terminal 1 and the terminal 2 for performing Sidelink communication, and then notifies the terminal 1 and the terminal 2 respectively through the Uu interface signalings;

for example, the base station 1 determines the SL-BWP used by the terminal 1 and the terminal 2 for performing Sidelink communication, and then notifies the base station 2 of the SL-BWP; then, the base station 1 and the base station 2 notify information of the SL-BWP to the terminal 1 and the terminal 2 respectively through Uu interface signalings.

2) a second situation: the terminal 1 determines the SL-BWP used by the terminal 1 and the terminal 2 for Sidelink communication, and then the terminal 1 reports information of the SL-BWP to the gNB cell or the eNB cell, then the gNB cell or the eNB cell sends configuration information of the determined SL-BWP to the terminal 2;

for example, the terminal 1 reports information of the determined SL-BWP to the base station 1, then the base station 1 sends configuration information of the determined SL-BWP to the base station 2, and the base station 2 sends configuration information of the determined SL-BWP to the terminal 2.

3) a third situation: the terminal 2 determines the SL-BWP used by the terminal 1 and the terminal 2 for performing Sidelink communication, and then the terminal 2 reports information of the SL-BWP to the gNB cell or the eNB cell, then the gNB cell or the eNB cell sends configuration information of the determined SL-BWP to the terminal 1;

for example, the terminal 2 reports information of the determined SL-BWP to the base station 2, and the base station 2 sends the configuration information of the determined SL-BWP to the base station 1, and the base station sends the configuration information of the determined SL-BWP to the terminal 1.

The application scenario of this embodiment is that both the terminal 1 and the terminal 2 are configured with the gNB synchronization source or the eNB synchronization source as the highest-priority synchronization source, and both terminals are synchronized with two different gNB cells or two different eNB cells. By adopting the solution in the embodiments of the present disclosure, it can be ensured that the terminal 1 and the terminal 2 can negotiate the SL-BWP used for performing Sidelink communication between the two terminals.

Figure 7:
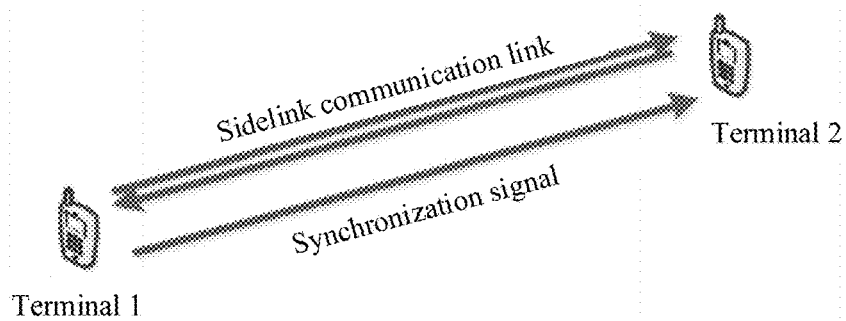
FIG. 7 is a fifth schematic diagram of an application scenario provided by an embodiment of the present disclosure.

As shown in FIG. 7, in one scene, gNB or eNB or GNSS is the highest-priority synchronization source, and a scene outside of coverage, and there is no GNSS signal, and the terminal 2 is synchronized with the terminal 1.

For the terminal 1 and the terminal 2, if the gNB synchronization source or the eNB synchronization source or a GNSS synchronization source is currently configured as the highest-priority synchronization source, and both terminals are within the signal coverage of two different gNB cells or two different eNB cells, respectively, and a GNSS signal cannot be received. Therefore, neither the terminal 1 nor the terminal 2 cannot be synchronized with the highest-priority synchronization source, then both the terminal 1 and the terminal 2 need to search other synchronization sources of terminals, i.e., need to receive S-SSBs sent by other synchronization sources of terminals. In this case, assuming that the terminal 1 is a synchronization source of the terminal 2, i.e., the terminal 2 receives a synchronization signal from the terminal 1.

When the terminal 1 and the terminal 2 are configured with at least two SL-BWPs, it is necessary to determine the SL-BWP used for performing Sidelink communication between the terminal 1 and the terminal 2. In this scenario, the method of indicating the SL-BWP used by the terminal 1 and the terminal 2 for performing Sidelink communication includes:

a first manner: the terminal 1 and the terminal 2 perform Sidelink communication by using the default SL-BWP; for example, a Default SL-BWP is pre-configured, which can be the SL-BWP used by the S-SSB, and this default SL-BWP is used for communication until a new configuration message is received;

a second manner: the terminal 1 sends a S-SSB, the S-SSB carries configuration information of SL-BWP used by the terminal 1 for Sidelink communication; after the terminal 2 receives the S-SSB, the terminal 2 is synchronized with the terminal 1, and Sidelink communication between the terminal 1 and the terminal 2 is performed by using the SL-BWP;

a third manner: during communication of the two terminals, the two terminals can interact, via a S-SSB or PSCCH channel, the SL-BWP used for subsequent communication; after the interaction is successful, the Sidelink communication can be performed by using the SL-BWP determined through the interaction.

The application scenario of this embodiment is that both the terminal 1 and the terminal 2 are configured with gNB or eNB or GNSS synchronization source as the highest-priority synchronization source, but the two terminals are outside the coverage and have no GNSS signal. In this case, the terminal 2 receives a synchronization signal from the terminal 1. By adopting the solution in the embodiments of the present disclosure, it can be ensured that the terminal 1 and the terminal 2 can negotiate the SL-BWP used for Sidelink communication between the two terminals.

Figure 8:
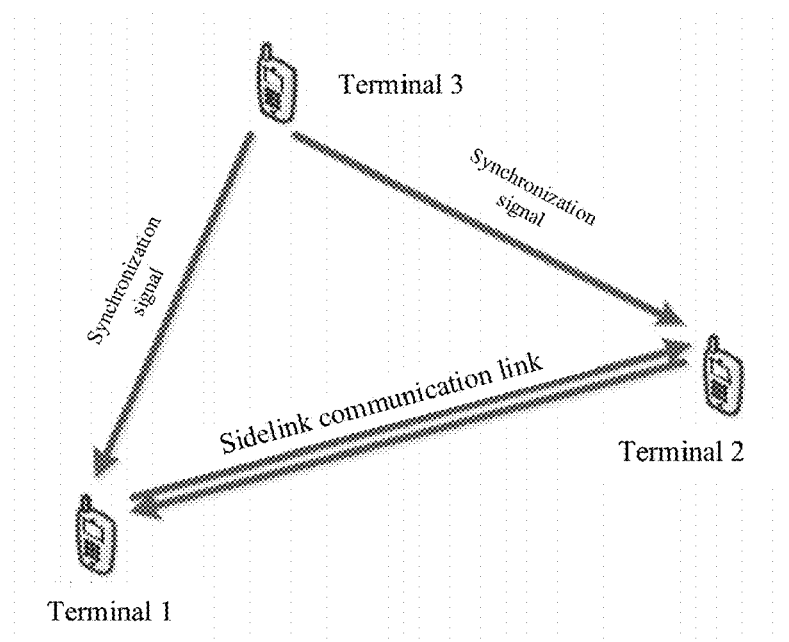
FIG. 8 is a sixth schematic diagram of an application scenario provided by an embodiment of the present disclosure.

As shown in FIG. 8, in one scenario, gNB or eNB or GNSS is the highest-priority synchronization source. Both terminals are outside the coverage of gNB or eNB signals, and there is no GNSS signal. Both the terminal 1 and the terminal 2 are synchronized with terminal 3.

For the terminal 1 and the terminal 2, if the gNB synchronization source or the eNB synchronization source or the GNSS synchronization source is currently configured as the highest-priority synchronization source, and both terminals are outside the coverage of gNB or eNB signals and cannot receive GNSS signals, both the terminal 1 and the terminal 2 cannot be synchronized with the gNB synchronization source or the eNB synchronization source or the GNSS synchronization source. In this case, since the terminal 1 and the terminal 2 cannot be synchronized with the highest-priority synchronization source, they need to find other synchronization sources of terminals, that is, they need to receive S-SSBs sent by other synchronization sources of terminals. In this case, it is assumed that a terminal 3 is the synchronization source for the terminal 1 and the terminal 2, that is, the terminal 1 and the terminal 2 obtain the synchronization signal from the terminal 3.

When the terminal 1 and the terminal 2 are configured with at least two SL-BWPs, it is necessary to determine the SL-BWP used for performing Sidelink communication between the terminal 1 and the terminal 2. In this scenario, the method of indicating the SL-BWP used by the terminal 1 and the terminal 2 for performing Sidelink communication includes:

a first manner: the terminal 1 and the terminal 2 perform Sidelink communication by using the default SL-BWP; for example, a Default SL-BWP is pre-configured, which can be the SL-BWP used by the S-SSB, and this Default SL-BWP is used for communication until a new configuration message is received;

a second manner: the terminal 3 sends an S-SSB, the S-SSB carries configuration information of the SL-BWP used for Sidelink communication between the terminal 1 and the terminal 2; after the terminal 1 and the terminal 2 receive the S-SSB sent by the terminal 3, the terminal 1 and the terminal 2 are synchronized with the terminal 3, and the SL-BWP is used by the terminal 1 and the terminal 2 for Sidelink communication;

a third manner: during communication of the two terminals, the two terminals can determine, through interaction via a S-SSB or PSCCH channel, the SL-BWP used for subsequent communication; after the interaction is successful, the Sidelink communication can be performed by using the SL-BWP determined through the interaction.

The application scenario of this embodiment is that both the terminal 1 and the terminal 2 are configured with the gNB synchronization source or the eNB synchronization source or the GNSS synchronization source as the highest-priority synchronization source, but the two terminals are outside the coverage and receive no GNSS signal. In this case, the terminal 1 and the terminal 2 receive synchronization signals from the terminal 3. By adopting the solution in this embodiment, it can be ensured that the terminal 1 and the terminal 2 can negotiate the SL-BWP used for performing Sidelink communication between the two terminals.

Figure 9:
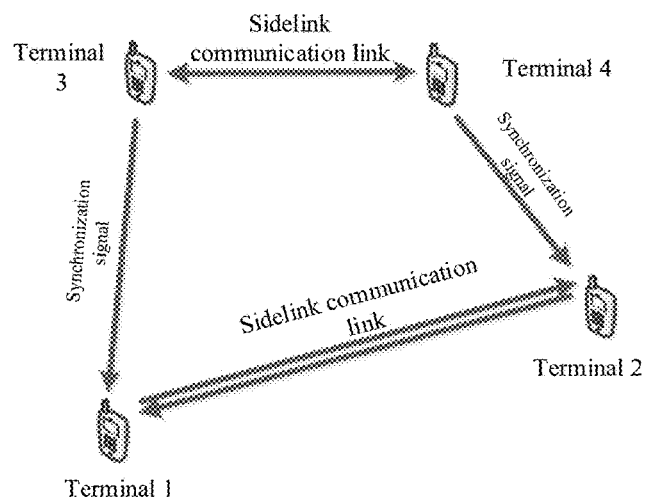
FIG. 9 is a seventh schematic diagram of an application scenario provided by an embodiment of the present disclosure.

As shown in FIG. 9, in one scenario, the gNB or the eNB or the GNSS is the highest-priority synchronization source, both terminals are outside the coverage of gNB or eNB signals and there is no GNSS signal, the terminal 1 is synchronized with the terminal 3, and the terminal 2 is synchronized with the terminal 4.

For the terminal 1 and the terminal 2, if the gNB synchronization source or the eNB synchronization source or the GNSS synchronization source is currently configured as the highest-priority synchronization source, and both terminals are outside the coverage of gNB or eNB signals and cannot receive GNSS signals, the terminal 1 and the terminal 2 cannot synchronize with gNB or eNB or GNSS synchronization sources. In this case, since the terminal 1 and the terminal 2 cannot be synchronized with the highest-priority synchronization source, they need to find other synchronization sources of terminals, that is, they need to receive S-SSBs sent by other synchronization sources of terminals. In this case, it is assumed that the terminal 3 is the synchronization source of the terminal 1 and a terminal 4 is the synchronization source of the terminal 2, that is, the terminal 1 obtains the synchronization signal from the terminal 3 and the terminal 2 obtains the synchronization signal from the terminal 4.

Under a condition that the terminal 1 and the terminal 2 are configured with at least two SL-BWPs, it is necessary to determine the SL-BWP used for performing Sidelink communication between the terminal 1 and the terminal 2. In this scenario, the method of indicating the SL-BWP used by the terminal 1 and the terminal 2 for performing Sidelink communication includes:

a first manner: the terminal 1 and the terminal 2 perform Sidelink communication by using the default SL-BWP; for example, a Default SL-BWP is pre-configured, which can be the SL-BWP used by the S-SSB, and this default SL-BWP is used for communication until a new configuration message is received;

a second manner: first, the terminal 3 and the terminal 4 negotiate through a Sidelink communication link, and determines configuration information of the SL-BWP used by the terminal 1 and the terminal 2 for Sidelink communication; the terminal 3 sends a S-SSB1, the S-SSB1 carries configuration information of the SL-BWP used by the terminal 1 and the terminal 2 for Sidelink communication; the terminal 4 sends a S-SSB2, the S-SSB2 carries configuration information of the SL-BWP used by the terminal 1 and the terminal 2 for Sidelink communication; after the terminal 1 receives the S-SSB1 sent by the terminal 3, the terminal 1 is synchronized with the terminal 3; after the terminal 2 receives the S-SSB2 sent by the terminal 4, the terminal 2 is synchronized with the terminal 4; the terminal 1 and the terminal 2 use configuration information of the SL-BWP for Sidelink communication between the terminal 1 and the terminal 2;

a third manner: during communication of the two terminals, the two terminals can interact, via a S-SSB or PSCCH channel, the SL-BWP used for subsequent communication; after the interaction is successful, the Sidelink communication can be performed by using the SL-BWP determined through the interaction.

The application scenario of this embodiment is that both the terminal 1 and the terminal 2 are configured with the gNB synchronization source or the eNB synchronization source or the GNSS synchronization source as the highest-priority synchronization source, but the two terminals are outside the coverage and have no GNSS signal. In this case, the terminal 1 receives a synchronization signal from the terminal 3, and the terminal 2 receives a synchronization signal from the terminal 4. By adopting the solution in the embodiments of the present disclosure, it can be ensured that the terminal 1 and the terminal 2 can negotiate the SL-BWP used for Sidelink communication between the two terminals.

As can be seen from the above description, an SL-BWP indication method used for Sidelink in the embodiments of the present disclosure can indicate, when at least two SL-BWPs are configured in the Sidelink communication, the SL-BWP used for a Sidelink communication link. Therefore, using the solutions of the embodiments of the present disclosure, the default SL-BWP or the SL-BWP indicated by signaling can be flexibly used for Sidelink communication, so as to improve configuration flexibility of the SL-BWPs, reduce the Sidelink communication delay and improve the success rate of transmission of Sidelink communication packets.

Figure 10:
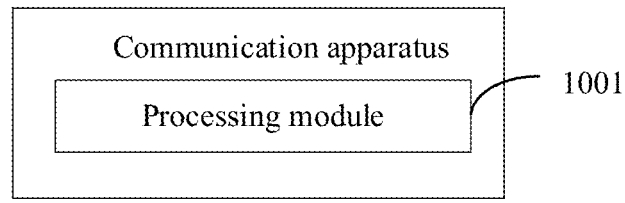
FIG. 10 is a first schematic diagram of a communication apparatus provided by an embodiment of the present disclosure.

Referring to FIG. 10, FIG. 10 is a structural diagram of a communication apparatus provided by an embodiment of the present disclosure. The communication apparatus applied to a first device. As shown in FIG. 10, the communication apparatus includes a processing module 1001.

The processing module 1001 is configured for, when at least two SL-BWPs are configured for Sidelink communication with a second device, performing Sidelink communication with the second device on a default first SL-BWP, or performing the Sidelink communication with the second device on a second SL-BWP configured by a signaling.

Optionally, the processing module is specifically configured for, under a condition that there is no signaling indicating the SL-BWP used for performing the Sidelink communication between the first device and the second device, performing the Sidelink communication with the second device on the default first SL-BWP; under a condition that the second SL-BWP is indicated, through a signaling, to be used for performing Sidelink communication between the first device and the second device, performing the Sidelink communication with the second device on the second SL-BWP.

Optionally, at least two SL-BWPs are configured on at least two carriers, and one SL-BWP is configured for one carrier.

Figure 11:
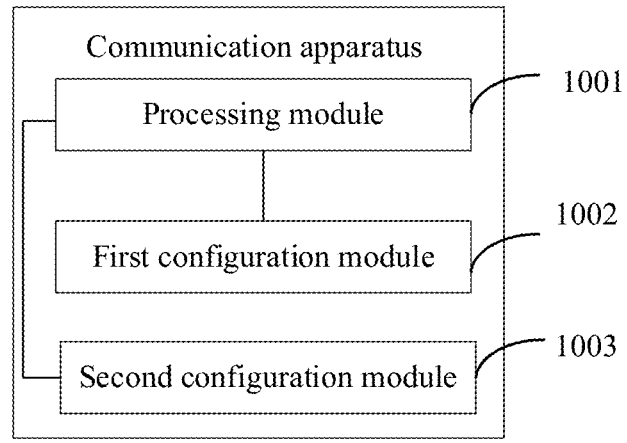
FIG. 11 is a second schematic diagram of a communication apparatus provided by an embodiment of the present disclosure.

Optionally, the second SL-BWP is configured by a signaling in a Sidelink communication link. As shown in FIG. 11, the apparatus may also include a first configuration module 1002 configured for configuring the second SL-BWP in any of the following ways: notifying configuration information of the second SL-BWP to the second device through a signaling carried in a S-SSB; receiving the configuration information of the second SL-BWP notified by the second device through the signaling carried in the S-SSB; notifying configuration information of the second SL-BWP to the second device through a signaling carried in a PSCCH; receiving configuration information of the second SL-BWP notified by the second device through the signaling carried in the PSCCH; receiving configuration information of the second SL-BWP notified by a third device through the signaling carried in the S-SSB, wherein the configuration information of the second SL-BWP is determined by the third device, or the configuration information of the second SL-BWP is determined by the third device and the fourth device through negotiation.

Optionally, configuration of the second SL-BWP is performed through a signaling in an air-interface Uu communication link. As shown in FIG. 11, the apparatus may also include a second configuration module 1003 configured for configuring the second SL-BWP in any of the following ways:

receiving configuration information of the second SL-BWP notified by a first base station through a SIB message, wherein the configuration information of the second SL-BWP is determined by the first base station, or is determined by the second device and sent to the first base station;

determining configuration information of the second SL-BWP, and sending the configuration information of the second SL-BWP to a second base station, so that the second base station notifies the second device of the configuration information of the second SL-BWP through a SIB message;

receiving configuration information of the second SL-BWP notified by a third base station through a SIB message, wherein the configuration information of the second SL-BWP is determined by negotiation between the third base station and a fourth base station, or determined by the second device and sent to the fourth base station and is sent to the third base station by the fourth base station;

determining configuration information of the second SL-BWP, and sending the configuration information of the second SL-BWP to the third base station, so that the third base station sends the configuration information of the second SL-BWP to the fourth base station, and the fourth base station notifies the second device of the configuration information of the second SL-BWP through a SIB message.

Optionally, the configuration information of the second SL-BWP includes at least one of the following: a CP type, a SCS, a size and a location of a BWP bandwidth, and the like of the second SL-BWP.

Optionally, the first SL-BWP is configured in a pre-configured manner; the pre-configuration manner includes pre-configuration implemented through pre-set when the device is produced in factory. It should be noted that the communication device of the embodiments of the present disclosure can realize each process executed by the first device in the embodiment of the above communication method, and can achieve the same technical effect. In order to avoid repetition, it will not be repeated here.

It should be noted that, the communication apparatus in the embodiments of the present application may implement each step performed by the first device in the above embodiments of the communication method, and the same technical effect may be achieved.

In the embodiments of the present disclosure, when at least two SL-BWPs are configured, the two devices can perform the Sidelink communication by using the determined SL-BWP, thereby improving the success rate of transmission of Sidelink communication packets.

Figure 12:
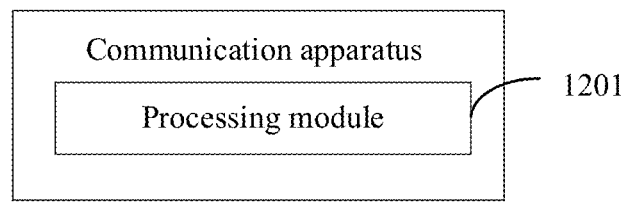
FIG. 12 is a third schematic diagram of a communication apparatus provided by an embodiment of the present disclosure.

Referring to FIG. 12, FIG. 12 is a structural diagram of a communication apparatus provided by an embodiment of the present disclosure. The communication apparatus is applied to a second device. As shown in FIG. 12, the communication apparatus includes a processing module 1201. The processing module 1201 is configured for, when at least two SL-BWPs are configured for Sidelink communication with a first device, performing the Sidelink communication with the first device on a default first SL-BWP, or performing the Sidelink communication with the first device on a second SL-BWP configured by a signaling.

Specifically, the processing module 1201 is configured for, under a condition that there is no signaling indicating the SL-BWP used for performing the Sidelink communication between the first device and the second device, performing the Sidelink communication with the first device on the default first SL-BWP; under a condition that the second SL-BWP is indicated, through a signaling, to be used for performing Sidelink communication between the first device and the second device, performing the Sidelink communication with the first device on the second SL-BWP.

Optionally, at least two SL-BWPs are configured on at least two carriers, and one SL-BWP is configured for one carrier.

Figure 13:
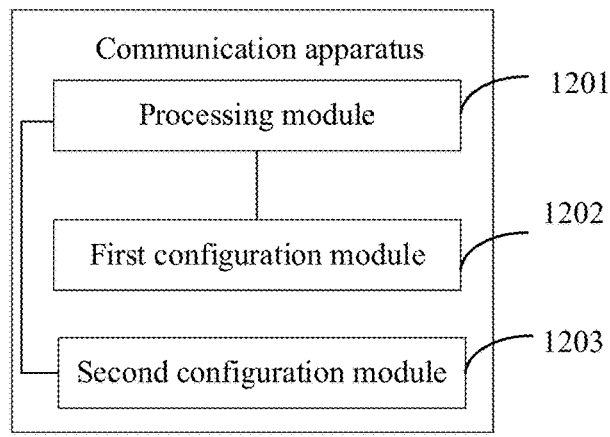
FIG. 13 is a fourth schematic diagram of a communication apparatus provided by an embodiment of the present disclosure.

Optionally, configuration of the second SL-BWP is performed through a signaling in a Sidelink communication link. As shown in FIG. 13, the apparatus may also include a first configuration module 1202. The first configuration module 1202 is configured for configuring the second SL-BWP in any of the following ways:

notifying configuration information of the second SL-BWP to the first device through a signaling carried in a S-SSB;

receiving the configuration information of the second SL-BWP notified by the first device through the signaling carried in the S-SSB;

notifying configuration information of the second SL-BWP to the first device through a signaling carried in PSCCH;

receiving configuration information of the second SL-BWP notified by the first device through the signaling carried in the PSCCH;

receiving configuration information of the second SL-BWP notified by a third device through a signaling carried in a S-SSB;

receiving configuration information of the second SL-BWP notified by a fourth device through a signaling carried in the S-SSB, wherein the configuration information of the second SL-BWP is determined by the third device and the fourth device through negotiation.

Optionally, configuration of the second SL-BWP is performed through a signaling in an air-interface Uu communication link. As shown in FIG. 13, the apparatus may also include a second configuration module 1203. The second configuration module 1203 is configured for configuring the second SL-BWP in any of the following ways:

receiving configuration information of the second SL-BWP notified by a first base station through a SIB message, wherein the configuration information of the second SL-BWP is determined by the first base station, or is determined by the first device and sent to the first base station;

determining configuration information of the second SL-BWP, and sending the configuration information of the second SL-BWP to the first base station, so that the first base station notifies the first device of the configuration information of the second SL-BWP through a SIB message;

receiving configuration information of the second SL-BWP notified by a fourth base station through a SIB message, wherein the configuration information of the second SL-BWP is determined by negotiation between a third base station and the fourth base station, or determined by the first device and sent to the third base station and is sent to the fourth base station by the third base station;

determining configuration information of the second SL-BWP, and sending the configuration information of the second SL-BWP to the fourth base station, so that the fourth base station sends the configuration information of the second SL-BWP to the third base station, and the fourth base station notifies the first device of the configuration information of the second SL-BWP through a SIB message.

Optionally, the configuration information of the second SL-BWP includes at least one of the following: a CP type, a SCS, a size and a location of a BWP bandwidth, and the like of the second SL-BWP.

Optionally, the first SL-BWP is configured in a pre-configured manner; the pre-configuration manner includes pre-configuration implemented through pre-set when the device is produced in factory.

It should be noted that the communication apparatus in the embodiments of the present disclosure can realize each step executed by the first device in the embodiments of the above communication method, and can achieve the same technical effect. In order to avoid repetition, detailed description thereof will not be repeated here.

In the embodiments of the present disclosure, when at least two SL-BWPs are configured, the two devices can perform Sidelink communication by using the determined SL-BWP, thereby improving the success rate of transmission of Sidelink communication packets.

Figure 14:
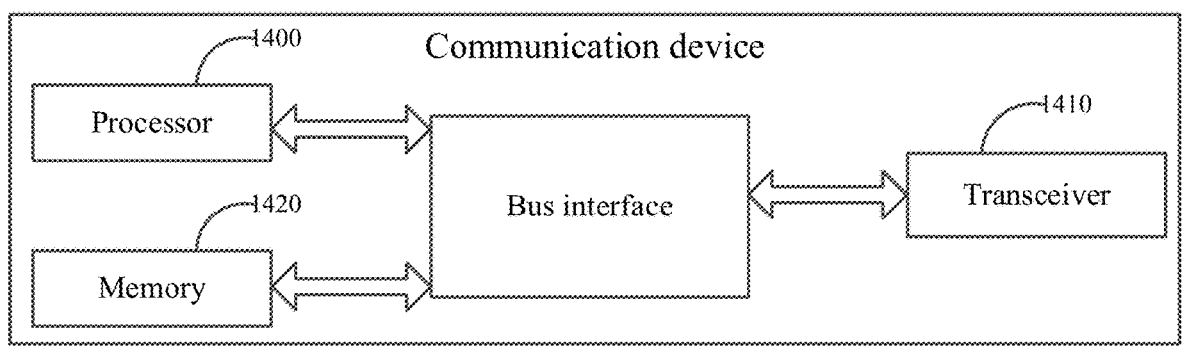
FIG. 14 is a first schematic diagram of a communication device provided by an embodiment of the present disclosure.

Referring to FIG. 14, FIG. 14 is a structural diagram of a communication device according to an embodiment of the present disclosure. The communication device is applied to a first device. As shown in FIG. 14, the communication device includes: a processor 1400, configured to read a program in a memory 1420 and perform the following steps: when at least two SL-BWPs are configured for Sidelink communication with a second device, performing the Sidelink communication with the second device on a default first SL-BWP, or performing the Sidelink communication with the second device on a second SL-BWP configured by a signaling; a transceiver 1410, configured for receiving and transmitting data under the control of the processor 1400.

In FIG. 14, a bus architecture may include any number of interconnected buses and bridges, specifically, various circuits such as one or at least two processors represented by the processor 1400 and a memory represented by the memory 1420 are linked together. The bus architecture can also link various other circuits such as peripherals, voltage regulators and power management circuits, which will not be further described herein. A bus interface provides an interface. The transceiver 1410 may be at least two elements, including a transmitter and a receiving, configured for providing a unit for communicating with various other devices over a transmission medium. The processor 1400 is responsible for managing the bus architecture and general processing, and the memory 1420 may store data used by the processor 1400 in performing operations.

The processor 1400 is responsible for managing the bus architecture and general processing, and the memory 1420 may store data used by the processor 1400 in performing operations.

The processor 1400 is also configured to read the computer program and perform the following steps: under a condition that there is no signaling indicating the SL-BWP used for performing the Sidelink communication between the first device and the second device, performing the Sidelink communication with the second device on the default first SL-BWP; under a condition that the second SL-BWP is indicated, through a signaling, to be used for performing Sidelink communication between the first device and the second device, performing the Sidelink communication with the second device on the second SL-BWP.

At least two SL-BWPs are configured on at least two carriers, and one SL-BWP is configured for one carrier.

Configuration of the second SL-BWP is performed through a signaling in a Sidelink communication link; the processor 1400 is further configured to read a program in the memory and perform any of the following processes:

notifying configuration information of the second SL-BWP to the second device through a signaling carried in a S-SSB;

receiving the configuration information of the second SL-BWP notified by the second device through the signaling carried in the S-SSB;

notifying configuration information of the second SL-BWP to the second device through a signaling carried in PSCCH;

receiving configuration information of the second SL-BWP notified by the second device through the signaling carried in the PSCCH;

receiving configuration information of the second SL-BWP notified by a third device through the signaling carried in the S-SSB, wherein the configuration information of the second SL-BWP is determined by the third device, or the configuration information of the second SL-BWP is determined by the third device and the fourth device through negotiation.

Configuration of the second SL-BWP is performed through a signaling in an air-interface Uu communication link; the processor 1400 is further configured to read a program in the memory and perform any of the following processes:

receiving configuration information of the second SL-BWP notified by a first base station through a SIB message, wherein the configuration information of the second SL-BWP is determined by the first base station, or is determined by the second device and sent to the first base station;

determining configuration information of the second SL-BWP, and sending the configuration information of the second SL-BWP to a second base station, so that the second base station notifies the second device of the configuration information of the second SL-BWP through a SIB message;

receiving configuration information of the second SL-BWP notified by a third base station through a SIB message, wherein the configuration information of the second SL-BWP is determined by negotiation between the third base station and a fourth base station, or determined by the second device and sent to the fourth base station and is sent to the third base station by the fourth base station;

determining configuration information of the second SL-BWP, and sending the configuration information of the second SL-BWP to the third base station, so that the third base station sends the configuration information of the second SL-BWP to the fourth base station, and the fourth base station notifies the second device of the configuration information of the second SL-BWP through a SIB message Optionally, the configuration information of the second SL-BWP includes at least one of the following: a CP type, a SCS, a size and a location of a BWP bandwidth, and the like of the second SL-BWP.

The processor 1400 is further configured to read the computer program and perform the following step: configuring the first SL-BWP in a pre-configured manner, wherein the pre-configured manner includes pre-configuration implemented through pre-set when the device is produced in factory.

It should be noted that, the communication device in the embodiments of the present disclosure may implement each step performed by the first device in the above embodiments of the communication method, and the same technical effect may be achieved. To avoid repetition, detailed description thereof is not repeated herein.

Figure 15:
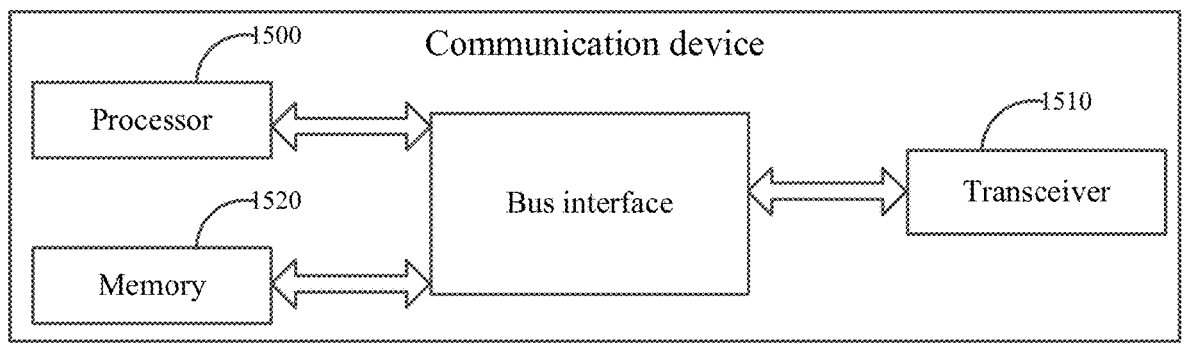
FIG. 15 is a second schematic diagram of a communication device provided by an embodiment of the present disclosure.

Referring to FIG. 15, FIG. 15 is a structural diagram of a communication device according to an embodiment of the present disclosure. The communication device is applied to a second device. As shown in FIG. 15, The communication device includes: a processor 1500 configured to read a program in a memory 1520 and perform the following steps: when at least two SL-BWPs are configured for Sidelink communication with a first device, performing the Sidelink communication with the first device on a default first SL-BWP, or performing the Sidelink communication with the first device on a second SL-BWP configured by a signaling; a transceiver 1510 configured for receiving and transmitting data under the control of the processor 1500.

In FIG. 15, a bus architecture may include any number of interconnected buses and bridges, specifically, various circuits such as one or at least two processors represented by the processor 1500 and a memory represented by the memory 1520 are linked together. The bus architecture can also link various other circuits such as peripherals, voltage regulators and power management circuits, which will not be further described herein. A bus interface provides an interface. The transceiver 1510 may be at least two elements, including a transmitter and a receiving, configured for providing a unit for communicating with various other devices over a transmission medium. The processor 1500 is responsible for managing the bus architecture and general processing, and the memory 1520 may store data used by the processor 1500 in performing operations.

The processor 1500 is responsible for managing the bus architecture and general processing, and the memory 1520 may store data used by the processor 1500 in performing operations.

The processor 1500 is also configured to read the computer program and perform the following steps: under a condition that there is no signaling indicating the SL-BWP used for performing the Sidelink communication between the first device and the second device, performing the Sidelink communication with the first device on the default first SL-BWP; under a condition that the second SL-BWP is indicated, through a signaling, to be used for performing Sidelink communication between the first device and the second device, performing the Sidelink communication with the first device on the second SL-BWP.

At least two SL-BWPs are configured on at least two carriers, and one SL-BWP is configured for one carrier.

Configuration of the second SL-BWP is performed through a signaling in a Sidelink communication link; the processor 1500 is further configured to read a program in the memory and perform any of the following processes:

notifying configuration information of the second SL-BWP to the first device through a signaling carried in a S-SSB;

receiving the configuration information of the second SL-BWP notified by the first device through the signaling carried in the S-SSB;

notifying configuration information of the second SL-BWP to the first device through a signaling carried in PSCCH;

receiving configuration information of the second SL-BWP notified by the first device through the signaling carried in the PSCCH;

receiving configuration information of the second SL-BWP notified by a third device through a signaling carried in a S-SSB;

receiving configuration information of the second SL-BWP notified by a fourth device through a signaling carried in the S-SSB, wherein the configuration information of the second SL-BWP is determined by the third device and the fourth device through negotiation.

Configuration of the second SL-BWP is performed through a signaling in an air-interface Uu communication link; the processor 1500 is also configured to read a program in the memory and perform any of the following processes:

receiving configuration information of the second SL-BWP notified by a first base station through a SIB message, wherein the configuration information of the second SL-BWP is determined by the first base station, or is determined by the first device and sent to the first base station;

determining configuration information of the second SL-BWP, and sending the configuration information of the second SL-BWP to the first base station, so that the first base station notifies the first device of the configuration information of the second SL-BWP through a SIB message;

receiving configuration information of the second SL-BWP notified by a fourth base station through a SIB message, wherein the configuration information of the second SL-BWP is determined by negotiation between a third base station and the fourth base station, or determined by the first device and sent to the third base station and is sent to the fourth base station by the third base station;

determining configuration information of the second SL-BWP, and sending the configuration information of the second SL-BWP to the fourth base station, so that the fourth base station sends the configuration information of the second SL-BWP to the third base station, and the fourth base station notifies the first device of the configuration information of the second SL-BWP through a SIB message.

The configuration information of the second SL-BWP includes at least one of the following: a CP type, a SCS, a size and a location of a BWP bandwidth of the second SL-BWP.

The processor 1500 is further configured to read the program in the memory and perform the following processes: configuring the first SL-BWP in a preconfigured manner; the pre-configured manner includes pre-configuration implemented through pre-set when the device is produced in factory.

It should be noted that the communication device of the embodiments of the present disclosure can realize each process executed by the second device in the embodiments of the above communication method, and can achieve the same technical effect. In order to avoid repetition, detailed description thereof will not be repeated here.

In addition, a computer-readable storage medium is provided in the embodiments of the present disclosure. The computer-readable storage medium is used to store a computer program. When the computer program is executed by a processor, the processor realizes the following steps: when at least two SL-BWPs are configured for Sidelink communication with a second device, performing the Sidelink communication with the second device on a default first SL-BWP, or performing the Sidelink communication with the second device on a second SL-BWP configured by a signaling.

Under a condition that there is no signaling indicating the SL-BWP used for performing the Sidelink communication between the first device and the second device, the Sidelink communication with the second device is performed by using the default first SL-BWP; under a condition that the second SL-BWP is indicated, through a signaling, to be used for performing Sidelink communication between the first device and the second device, the Sidelink communication with the second device is performed by using the second SL-BWP.

At least two SL-BWPs are configured on at least two carriers, and one SL-BWP is configured for one carrier.

The second SL-BWP is configured by a signaling in a Sidelink communication link, and a manner of the configuration includes any of the following:

notifying configuration information of the second SL-BWP to the second device through a signaling carried in a Sidelink Synchronization Signal Block (S-SSB);

receiving the configuration information of the second SL-BWP notified by the second device through the signaling carried in the S-SSB;

notifying configuration information of the second SL-BWP to the second device through a signaling carried in a Physical Sidelink Control Channel (PSCCH);

receiving configuration information of the second SL-BWP notified by the second device through the signaling carried in the PSCCH;

receiving configuration information of the second SL-BWP notified by a third device through the signaling carried in the S-SSB, wherein the configuration information of the second SL-BWP is determined by the third device, or the configuration information of the second SL-BWP is determined by the third device and the fourth device through negotiation.

Configuration of the second SL-BWP is performed through a signaling in an air-interface Uu communication link, and a manner of the configuration includes any of the following:

receiving configuration information of the second SL-BWP notified by a first base station through a SIB message, wherein the configuration information of the second SL-BWP is determined by the first base station, or is determined by the second device and sent to the first base station;

determining configuration information of the second SL-BWP, and sending the configuration information of the second SL-BWP to a second base station, so that the second base station notifies the second device of the configuration information of the second SL-BWP through SIB message;

receiving configuration information of the second SL-BWP notified by a third base station through a SIB message, wherein the configuration information of the second SL-BWP is determined by negotiation between the third base station and a fourth base station, or determined by the second device and sent to the fourth base station and is sent to the third base station by the fourth base station;

determining configuration information of the second SL-BWP, and sending the configuration information of the second SL-BWP to the third base station, so that the third base station sends the configuration information of the second SL-BWP to the fourth base station, and the fourth base station notifies the second device of the configuration information of the second SL-BWP through a SIB message.

The configuration information of the second SL-BWP includes at least one of the following: a CP (Cyclic prefix) type, a SCS (SubCarrier Spacing), a size and a location of a BWP (Bandwidth Part) bandwidth of the second SL-BWP.

The first SL-BWP is configured through a pre-configured manner. The pre-configured manner includes pre-configuration implemented through pre-set when the device is produced in factory.

In addition, a computer-readable storage medium is provided in the embodiments of the present disclosure. The computer-readable storage medium is configured to store a computer program. When the computer program is executed by a processor, the processor implements the following steps: when at least two SL-BWPs are configured for Sidelink communication with a first device, performing the Sidelink communication with the first device on a default first SL-BWP, or performing the Sidelink communication with the first device on a second SL-BWP configured by a signaling.

Under a condition that there is no signaling indicating the SL-BWP used for performing the Sidelink communication between the first device and the second device, the Sidelink communication with the first device is performed on the default first SL-BWP; under a condition that the second SL-BWP is indicated, through a signaling, to be used for performing Sidelink communication between the first device and the second device, the Sidelink communication with the first device is performed on the second SL-BWP.

At least two SL-BWPs are configured on at least two carriers, and one SL-BWP is configured for one carrier.

Configuration of the second SL-BWP is performed through a signaling in a Sidelink communication link, and a manner of the configuration includes any of the following:

notifying configuration information of the second SL-BWP to the first device through a signaling carried in a S-SSB;

receiving the configuration information of the second SL-BWP notified by the first device through the signaling carried in the S-SSB;

notifying configuration information of the second SL-BWP to the first device through a signaling carried in PSCCH;

receiving configuration information of the second SL-BWP notified by the first device through the signaling carried in the PSCCH;

receiving configuration information of the second SL-BWP notified by a third device through a signaling carried in a S-SSB;

receiving configuration information of the second SL-BWP notified by a fourth device through a signaling carried in the S-SSB, wherein the configuration information of the second SL-BWP is determined by the third device and the fourth device through negotiation.

Configuration of the second SL-BWP is performed through a signaling in an air-interface Uu communication link, and a manner of the configuration includes any of the following:

receiving configuration information of the second SL-BWP notified by a first base station through a SIB message, wherein the configuration information of the second SL-BWP is determined by the first base station, or is determined by the first device and sent to the first base station;

determining configuration information of the second SL-BWP, and sending the configuration information of the second SL-BWP to the first base station, so that the first base station notifies the first device of the configuration information of the second SL-BWP through a SIB message;

receiving configuration information of the second SL-BWP notified by a fourth base station through a SIB message, wherein the configuration information of the second SL-BWP is determined by negotiation between a third base station and the fourth base station, or determined by the first device and sent to the third base station and is sent to the fourth base station by the third base station;

determining configuration information of the second SL-BWP, and sending the configuration information of the second SL-BWP to the fourth base station, so that the fourth base station sends the configuration information of the second SL-BWP to the third base station, and the fourth base station notifies the first device of the configuration information of the second SL-BWP through a SIB message.

The configuration information of the second SL-BWP includes at least one of the following: a CP type, a SCS, a size and a location of a BWP bandwidth of the second SL-BWP.

The first SL-BWP is configured in a pre-configured manner; the pre-configured manner includes pre-configuration implemented through pre-set when the device is produced in factory.

In several embodiments provided in the present application, it should be understood that the disclosed methods and devices can be implemented in other ways. For example, the device embodiments described above are only schematic. For example, division of units is only a logical division for functions, and there can be another division in actual implementation. For example, at least two units or components can be combined or integrated into another system, or some features can be ignored or not executed. On the other hand, mutual coupling or direct coupling or communication connection shown or discussed can be indirect coupling or indirect communication connection through some interfaces, devices or units, and can be electrical, mechanical or in other forms.

In addition, functional units in various embodiments of the present disclosure can be integrated into one processing unit, each unit can be physically included separately therein, or two or more units can be integrated into one unit. The above integrated units can be realized in form of hardware or in form of hardware plus software functional units.

The integrated units realized in the form of software functional units can be stored in a computer-readable storage medium. The software functional units are stored in a storage medium and include several instructions to enable a computer device (which can be a personal computer, a server, a network device, etc.) to perform some steps of a transmission method and a reception method described in various embodiments of the present disclosure. The aforementioned storage media include: media that can store program code, such as a USB flash disk, a mobile hard disk, a Read-Only Memory (ROM), a Random Access Memory (RAM), a magnetic disc, an optical disc, or the like.

It is understood that these embodiments described in the embodiments of the present disclosure may be implemented in hardware, software, firmware, middleware, microcode, or a combination thereof. For implementation by hardware, units, modules, subunits and submodules can be implemented in one or more of Application Specific Integrated Circuits (ASIC), Digital Signal Processing (DSP), DSP Device (DSPD), a Programmable Logic Device (PLD), a Field-Programmable Gate Array (FPGA), a general-purpose processor, a controller, a microcontroller, a microprocessor, other electronic units for performing the functions described in the present disclosure, or a combination thereof.

For implementation by software, technologies described in the embodiments of the present disclosure can be realized by modules (such as processes, functions, etc.) that perform the functions described in the embodiments of the present disclosure. Software codes can be stored in a memory and executed by a processor. The memory can be implemented in the processor or outside the processor.

The above provides optional embodiments of the present disclosure. It should be noted that those skilled in the art can further make a number of improvements and refinements without departing from the principles of the present disclosure, and these improvements and refinements should also be regarded to be within the protection scope of the present disclosure.

What is claimed is:

1. A communication method performed by a first device, comprising:
    performing Sidelink communication with a second device on a second Sidelink Bandwith Part (SL-BWP) configured by a signaling, when at least two SL-BWPs are configured for the Sidelink communication with the second device,
    wherein configuration of the second SL-BWP is performed through a signaling in an air-interface Uu communication link, and a manner of the configuration comprises any of the following:
        receiving configuration information of the second SL-BWP notified by a first base station through a System Information Block (SIB) message, wherein the configuration information of the second SL-BWP is determined by the first base station, or is determined by the second device and sent to the first base station;
        determining configuration information of the second SL-BWP, and sending the configuration information of the second SL-BWP to a second base station, so that the second base station notifies the second device of the configuration information of the second SL-BWP through a SIB message;
        receiving configuration information of the second SL-BWP notified by a third base station through a SIB message, wherein the configuration information of the second SL-BWP is determined by negotiation between the third base station and a fourth base station, or determined by the second device and sent to the fourth base station and is sent to the third base station by the fourth base station;
        determining configuration information of the second SL-BWP, and sending the configuration information of the second SL-BWP to the third base station, so that the third base station sends the configuration information of the second SL-BWP to the fourth base station, and the fourth base station notifies the second device of the configuration information of the second SL-BWP through a SIB message.

2. The method according to claim 1, wherein,
    under a condition that the second SL-BWP is indicated, through a signaling, to be used for performing the Sidelink communication between the first device and the second device, the Sidelink communication with the second device is performed on the second SL-BWP.

3. The method according to claim 2, wherein the at least two SL-BWPs are configured on at least two carriers, and one SL-BWP is configured for one carrier.

4. The method according to claim 1, wherein the configuration information of the second SL-BWP comprises at least one of the following:
    a Cyclic Prefix (CP) type, a SubCarrier Spacing (SCS), a size and a location of a BWP (Bandwidth Part) bandwidth of the second SL-BWP.

5. A communication method performed by a second device, comprising:
    performing Sidelink communication with a first device on a second Sidelink Bandwith Part (SL-BWP) configured by a signaling, when at least two SL-BWPs are configured for the Sidelink communication with the first device, configuration of the second SL-BWP is performed through a signaling in an air-interface Uu communication link, and a manner of the configuration comprises any of the following:
        receiving configuration information of the second SL-BWP notified by a first base station through a System Information Block (SIB) message, wherein the configuration information of the second SL-BWP is determined by the first base station, or is determined by the first device and sent to the first base station;
        determining configuration information of the second SL-BWP, and sending the configuration information of the second SL-BWP to the first base station, so that the first base station notifies the first device of the configuration information of the second SL-BWP through a SIB message;
        receiving configuration information of the second SL-BWP notified by a fourth base station through a SIB message, wherein the configuration information of the second SL-BWP is determined by negotiation between a third base station and the fourth base station, or determined by the first device and sent to the third base station and is sent to the fourth base station by the third base station;
        determining configuration information of the second SL-BWP, and sending the configuration information of the second SL-BWP to the fourth base station, so that the fourth base station sends the configuration information of the second SL-BWP to the third base station, and the fourth base station notifies the first device of the configuration information of the second SL-BWP through a SIB message ..

6. The method according to claim 5, wherein,
under a condition that the second SL-BWP is indicated, through a signaling, to be used for performing the Sidelink communication between the first device and the second device, the Sidelink communication with the first device is performed on the second SL-BWP.

7. The method according to claim 6, wherein the at least two SL-BWPs are configured on at least two carriers, and one SL-BWP is configured for one carrier.

8. The method according to claim 5, wherein the configuration information of the second SL-BWP comprises at least one of the following:
a Cyclic Prefix (CP) type, a SubCarrier Spacing (SCS), a size and a location of a BWP (Bandwidth Part) bandwidth of the second SL-BWP.

9. A communication device applied to a first device, comprising:
a transceiver, a memory, a processor and a computer program stored on the memory and executable on the processor; wherein, the processor is configured to read the program in the memory and execute the following steps:
performing Sidelink communication with a second device on a second Sidelink Bandwith Part (SL-BWP) configured by a signaling, when at least two SL-BWPs are configured for the Sidelink communication with the second device,
wherein configuration of the second SL-BWP is performed through a signaling in an air-interface Uu communication link, the processor is further configured to read the program in the memory and perform any of the following:
receiving configuration information of the second SL-BWP notified by a first base station through a System Information Block (SIB) message, wherein the configuration information of the second SL-BWP is determined by the first base station, or is determined by the second device and sent to the first base station;
determining configuration information of the second SL-BWP, and sending the configuration information of the second SL-BWP to a second base station, so that the second base station notifies the second device of the configuration information of the second SL-BWP through a SIB message;
receiving configuration information of the second SL-BWP notified by a third base station through a SIB message, wherein the configuration information of the second SL-BWP is determined by negotiation between the third base station and a fourth base station, or determined by the second device and sent to the fourth base station and is sent to the third base station by the fourth base station;
determining configuration information of the second SL-BWP, and sending the configuration information of the second SL-BWP to the third base station, so that the third base station sends the configuration information of the second SL-BWP to the fourth base station, and the fourth base station notifies the second device of the configuration information of the second SL-BWP through a SIB message.

10. The device according to claim 9, wherein the processor is further configured to read the program in the memory and perform the following steps:
performing the Sidelink communication with the second device on the second SL-BWP, under a condition that the second SL-BWP is indicated, through a signaling, to be used for performing the Sidelink communication between the first device and the second device.

11. The device according to claim 10, wherein the at least two SL-BWPs are configured on at least two carriers, and one SL-BWP is configured for one carrier.

12. A communication device applied to a second device, comprising:
a transceiver, a memory, a processor and a computer program stored on the memory and executable on the processor; wherein, the processor is configured to read the program in the memory and execute the following steps:
performing Sidelink communication with a first device on a second Sidelink Bandwidth Part (SL-BWP) configured by a signaling, when at least two SL-BWPs are configured for the Sidelink communication with the first device,
wherein configuration of the second SL-BWP is performed through a signaling in an air-interface Uu communication link, the processor is further configured to read the program in the memory and perform any of the following:
receiving configuration information of the second SL-BWP notified by a first base station through a System Information Block (SIB) message, wherein the configuration information of the second SL-BWP is determined by the first base station, or is determined by the first device and sent to the first base station;
determining configuration information of the second SL-BWP, and sending the configuration information of the second SL-BWP to the first base station, so that the first base station notifies the first device of the configuration information of the second SL-BWP through a SIB message;
receiving configuration information of the second SL-BWP notified by a fourth base station through a SIB message, wherein the configuration information of the second SL-BWP is determined by negotiation between a third base station and the fourth base station, or determined by the first device and sent to the third base station and is sent to the fourth base station by the third base station;
determining configuration information of the second SL-BWP, and sending the configuration information of the second SL-BWP to the fourth base station, so that the fourth base station sends the configuration information of the second SL-BWP to the third base station, and the fourth base station notifies the first device of the configuration information of the second SL-BWP through a SIB message.

13. The device according to claim 12, wherein the processor is further configured to read the program in the memory and perform the following steps:
performing the Sidelink communication with the first device on the second SL-BWP, under a condition that the second SL-BWP is indicated, through a signaling, to be used for performing the Sidelink communication between the first device and the second device.

14. The device according to claim 13, wherein the at least two SL-BWPs are configured on at least two carriers, and one SL-BWP is configured for one carrier.

* * * * *